UNITED STATES PATENT OFFICE.

PATRICK N. MACKAY, OF SAN FRANCISCO, CALIFORNIA.

IMPROVEMENT IN FLUXES FOR TREATING ORES AND METALS.

Specification forming part of Letters Patent No. 145,580, dated December 16, 1873; application filed November 18, 1873.

*To all whom it may concern:*

Be it known that I, PATRICK N. MACKAY, of San Francisco city and county, State of California, have invented an Improved Flux for Reducing and Refining Ores and Metals; and I do hereby declare the following description and accompanying drawings are sufficient to enable any person skilled in the art or science to which it most nearly appertains to make and use my said invention or improvement without further invention or experiment.

My invention relates to an improved mixture of ingredients to be used as a flux or purifying and refining agent for all metals and their ores.

My improved composition consists of a mixture composed of either borate of lime, borate of soda, borate of magnesia, or crude borax, with silica in the form of infusorial earth or silicious diatoms, and chloride of sodium, in their proper proportions, to be used as a dry powder, to be blown into the furnace or refinery through the tuyeres; and the ingredients above named may be mixed with oils (preferably hydrocarbon oils,) or glycerine, or molasses, and with charcoal-powder, ground peat, sawdust, flour, or bran, to form a pasty mass, together with the necessary quantity of powdered quicklime, or fluor-spar, or dolomite, to give adhesion to the particles, which can be compressed into grains, pellets, balls, brequettes, or bricks, as desired.

The process of applying the foregoing, and the proportions of each ingredient to be used, will vary according to the impurities contained in the metals or ores. For instance, in purifying iron or steel containing an excess of silicon, I use two per cent. of either borate above mentioned and five per cent. of chloride of sodium, mixed intimately together, as a dry powder, to be injected into the molten mass through the tuyeres; or the same ingredients are mixed with powdered charcoal and oil, and formed into a pasty mass with the addition of either powdered fluor-spar, or quicklime, or dolomite, and then compressed into grains, pellets, or balls, which can be placed in the furnace in any convenient manner, either through the tuyeres or mixed with the ore when charging the furnace. If there is no excess of silicon in the metals, then I use two per cent. of the infusorial earth, one per cent. of any of the borates, and five per cent. of the chloride of sodium, well incorporated, which may be injected, as above described.

To prepare the mixtures, I take, for example, one per cent., or twenty pounds, of any of the borates mentioned, two per cent., or forty pounds, of infusorial earth, and five per cent., or one hundred pounds, of chloride of sodium. I mix these ingredients, and put them through a pulverizing-mill—say, a Whelpley and Stores' pulverizer—by which they are reduced to a fine powder and thoroughly incorporated in the same operation, when they are ready to be used as a dry powder.

In order to prepare my mixture for transportation, or to render it more convenient to handle, I shall usually convert it into the form of paste, or as a fine powder, or in small pellets, as above mentioned. To do this, I add to the above ingredients charcoal-powder, or powdered peat, or sawdust, or flour, or bran, and mix it by means of the pulverizer. I then remove the dry mixture from the pulverizer or mixing-mill to a platform, and add hydrocarbon or other oil, or molasses, or glycerine, and put it into a pug-mill, or edge-mill, or any other kind of mill fit for mixing the pasty mass. While the pasty mass is being passed through this mill, I add a sufficient quantity of powdered fluor-spar, or quicklime, or dolomite, to make the particles adhesive, and fit to be compressed into grains, pellets, brequettes, or bricks. The incorporated mass is then ready to be compressed, by a hydrostatic or other suitable press, into the shapes and sizes desired, much in the same manner as gunpowder is pressed.

The mixture can be fed to the furnace through the tuyeres by any convenient device; but I prefer to employ a cup, the bottom of which is connected with the blast-pipe by means of a short tube, in the length of which is a regulating-cock, so that the feed of the powder through the tube can be regulated as required. The upper end of the cup must be tightly closed to prevent the blast from blowing the powder out through the top.

The foregoing compositions of ingredients, when properly used, cause the metals to be very fluid in the furnace, and aid in removing all deleterious matters, such as phosphorus and sulphur, thus hastening the operation, and saving time, labor, and fuel.

Having thus described my invention, I claim—

A flux or refining-compound, composed of borax, or any of the borates, or crude borax, with silica in the form of infusorial earth or silicious diatoms, and chloride of sodium, substantially as herein set forth.

In witness whereof I hereunto set my hand and seal.

PATRICK N. MACKAY. [L. S.]

Witnesses:
JOHN L. BOONE,
C. MILTON RICHARDSON.